(12) United States Patent
Tsai et al.

(10) Patent No.: US 9,384,162 B2
(45) Date of Patent: Jul. 5, 2016

(54) MOBILE DEVICE, TRANSACTION SYSTEM INCLUDING THE MOBILE DEVICE, AND METHOD OF SIGNAL TRANSMISSION IN A MOBILE DEVICE

(71) Applicants: Irene Tsai, New Taipei (TW); Yi-Fen Chou, Keelung (TW)

(72) Inventors: Irene Tsai, New Taipei (TW); Yi-Fen Chou, Keelung (TW)

( * ) Notice: Subject to any disclaimer, the term of this patent is extended or adjusted under 35 U.S.C. 154(b) by 580 days.

(21) Appl. No.: 13/827,055

(22) Filed: Mar. 14, 2013

(65) Prior Publication Data

US 2013/0275641 A1      Oct. 17, 2013

(30) Foreign Application Priority Data

Mar. 29, 2012  (TW) .............................. 101111115 A

(51) Int. Cl.
| | | |
|---|---|---|
| *G06F 13/40* | (2006.01) | |
| *G06Q 20/32* | (2012.01) | |
| *H04M 17/02* | (2006.01) | |

(52) U.S. Cl.
CPC ........ *G06F 13/4068* (2013.01); *G06F 13/4022* (2013.01); *G06Q 20/3226* (2013.01); *H04M 17/026* (2013.01)

(58) Field of Classification Search
CPC .......................... G06F 13/4022; G06F 13/4068
See application file for complete search history.

(56) References Cited

U.S. PATENT DOCUMENTS

| | | | | |
|---|---|---|---|---|
| 2006/0133415 A1* | 6/2006 | Mueller | ................ | H04W 92/18 370/466 |
| 2009/0102741 A1* | 4/2009 | Li | ......................... | G06K 19/077 343/866 |
| 2010/0105434 A1* | 4/2010 | Hong | ...................... | H04W 4/20 455/558 |
| 2010/0117800 A1* | 5/2010 | Li | ......................... | G06K 19/077 340/10.1 |
| 2012/0052801 A1* | 3/2012 | Kulkarni | .............. | G06K 7/0008 455/41.1 |

FOREIGN PATENT DOCUMENTS

| | | |
|---|---|---|
| CN | 101013903 | 8/2007 |
| EP | 2251986 | 11/2010 |

OTHER PUBLICATIONS

European Search Report-Application No. EP 13161672, Jul. 9, 2013, The Hague.

* cited by examiner

*Primary Examiner* — Nimesh G Patel

(74) *Attorney, Agent, or Firm* — SmithAmundsen LLC; Kelly J. Smith; Stephen L. Farris

(57) ABSTRACT

A mobile device includes a baseband module, an electronic card slot and a control module. A control unit of the control module is configured to control a switching unit to operate in a first transmission mode, such that the baseband module is able to communicate with an electronic card that is connected to the electronic card slot, based on a baseband signal received from the baseband module. The control unit is further configured to control the switching unit to operate in a second transmission mode, such that the control unit that executes an executable program is able to communicate with the electronic card that is connected to the electronic card slot.

19 Claims, 13 Drawing Sheets

MOBILE DEVICE, TRANSACTION SYSTEM INCLUDING THE MOBILE DEVICE, AND METHOD OF SIGNAL TRANSMISSION IN A MOBILE DEVICE

CROSS-REFERENCE TO RELATED APPLICATION

This application claims priority of Taiwanese Application No. 101111115, filed on Mar. 29, 2012.

BACKGROUND OF THE INVENTION

1. Field of the Invention

The invention relates to a mobile device, more particularly to a mobile device that is based on Java card virtual machine architecture.

2. Description of the Related Art

FIG. 1 illustrates circuitry of a conventional mobile device 900. The mobile device 900 includes a baseband module 910, and an electronic card slot 920 that is coupled to the baseband module 910. The electronic card slot 920 is typically for receiving a subscriber identity module (SIM) card therein so as to electrically connect the SIM card and the baseband module 910 for communicating with the baseband module 910.

In order to accommodate a growing need for frequent use of commercial applications (e.g., online transaction) that require a high security level on the mobile device 900, another identification mechanism is needed (e.g., a bankcard, another SIM from a separate mobile telephony service provider, etc.). Conventionally, such identification mechanism is implemented in the operating system of the mobile device 900 using software. Nonetheless, the software-based identification mechanism may face safety threat from malicious programs (e.g., a Trojan horse), and as a result, a hardware-based identification mechanism is more preferable. However, the hardware-based identification mechanism is an external device (e.g., an electronic card) that must be physically connected to the mobile device 900, such that an additional expansion slot may be required. Since the electronic card slot 920 is only configured to communicate with the baseband module 910, and the identification mechanism may need to communicate with other modules in the mobile device 900, using the electronic card slot 920 to receive the hardware-based identification mechanism may be insufficient to fulfill such needs.

A number of solutions have been provided to address this problem. For example, a secure digital (SD) card slot 930 and/or a universal serial bus (USB) port 940 can be used to receive such hardware-based identification mechanism. But such solution may not be preferable due to the fact that the communication specification used by the hardware-based identification mechanism (i.e., International Organization for Standardization (ISO) 7816 specification) may not conform with that used by the SD card slot 930 and the USB port 940, and that some mobile devices 900 (e.g., iPhone) do not have the SD card slot 930 and the USB port 940.

Another solution involves implementing the hardware-based identification mechanism onto a thin film that can be attached to the SIM card. But the thickness of the thin film that adds to the attached SIM card renders the SIM card difficult to be received by the electronic card slot 920, sometimes even requiring a hole be drilled in the SIM card in order to fit in the electronic card slot 920.

SUMMARY OF THE INVENTION

Therefore, the object of the present invention is to provide a mobile device that can fulfill the need for the additional expansion slot without encountering the above-mentioned drawbacks.

Accordingly, a mobile device of the present invention includes a first baseband module, a first electronic card slot to be connected to an electronic card, and a control module.

The control module includes a first input/output (I/O) port coupled to the first baseband module, a second I/O port coupled to the first electronic card slot, a switching unit connected electrically to the first and second I/O ports, a control unit coupled to the switching unit, and a storage unit coupled to the control unit and having at least one executable program stored therein.

The control unit is configured to control the switching unit to operate in a first transmission mode, in which the first I/O port and the second I/O port are electrically interconnected such that the first baseband module is able to communicate with the electronic card that is connected to the first electronic card slot, based on a baseband signal received from the first baseband module via the first I/O port and the switching unit.

The control unit is further configured to control the switching unit to operate in a second transmission mode, in which the second I/O port and the control unit are electrically interconnected such that the control unit that executes the at least one executable program stored in the storage unit is able to communicate with the electronic card that is connected to the first electronic card slot.

In some embodiments, the control module can be an individual electronic card.

Another object of the present invention is to provide a transaction system using the mobile device.

Accordingly, a transaction system of the present invention includes a network platform and a mobile device. The network platform includes a security application management system that includes a plurality of programs, and a communication interface. The mobile device includes a baseband module configured to communicate with the network platform via the communication interface, a first electronic card slot to be connected to an electronic card, and a control module.

The control module includes a first input/output (I/O) port coupled to the baseband module, a second I/O port coupled to the first electronic card slot, a switching unit connected electrically to the first and second I/O ports, a control unit coupled to the switching unit, and a storage unit coupled to the control unit.

The control unit is configured to:

download at least one of the programs from the security application management system;

store the at least one of the programs in the storage unit;

control the switching unit to operate in a first transmission mode, in which the first I/O port and the second I/O port are electrically interconnected such that the baseband module is able to communicate with the electronic card that is connected to the first electronic card slot, based on a baseband signal received from the baseband module via the first I/O port and the switching unit; and control the switching unit to operate in a second transmission mode, in which the second I/O port and the control unit are electrically interconnected such that the control unit that executes the at least one of the programs in the storage unit is able to communicate with the electronic card that is connected to the first electronic card slot.

Yet another object of the present invention is to provide a method of signal transmission to be implemented by a control module of a mobile device. Specifically, the method can be implemented by a signal transmission machine that is a Java-based virtual machine having multiple input/output (I/O) ports.

The control module includes a first input/output (I/O) port to be coupled to an input module, a second I/O port to be coupled to an electronic card slot, a switching unit connected electrically to the first and second I/O ports, and a control unit coupled to the switching unit. The method includes the following steps of:

configuring the control unit to control the switching unit to operate in a first transmission mode, in which the first I/O port and the second I/O port are electrically interconnected, when a flag of an input signal received from the input module using the first I/O port conforms with a corresponding flag in the control unit; and configuring the control unit to open a specific channel and to temporarily stop transmission within other channels when a multi-channel management instruction indicating the specific channel is received from the input module via the first I/O port.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
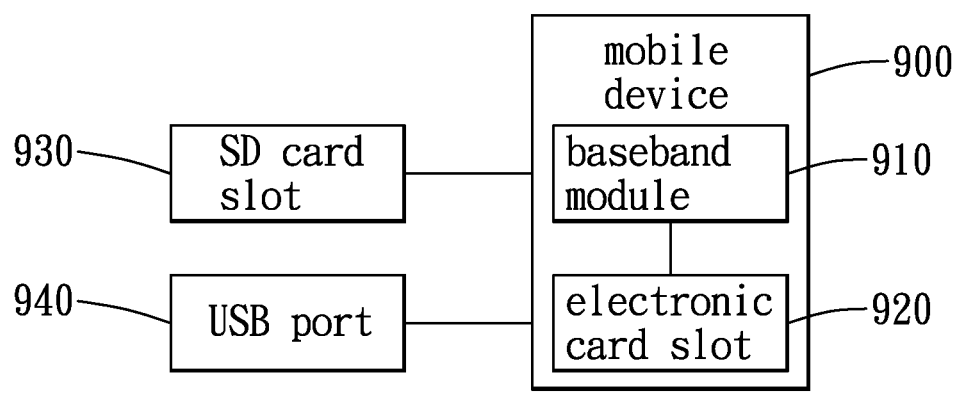
FIG. 1 is a schematic block diagram of a conventional mobile device.
Figure 2:
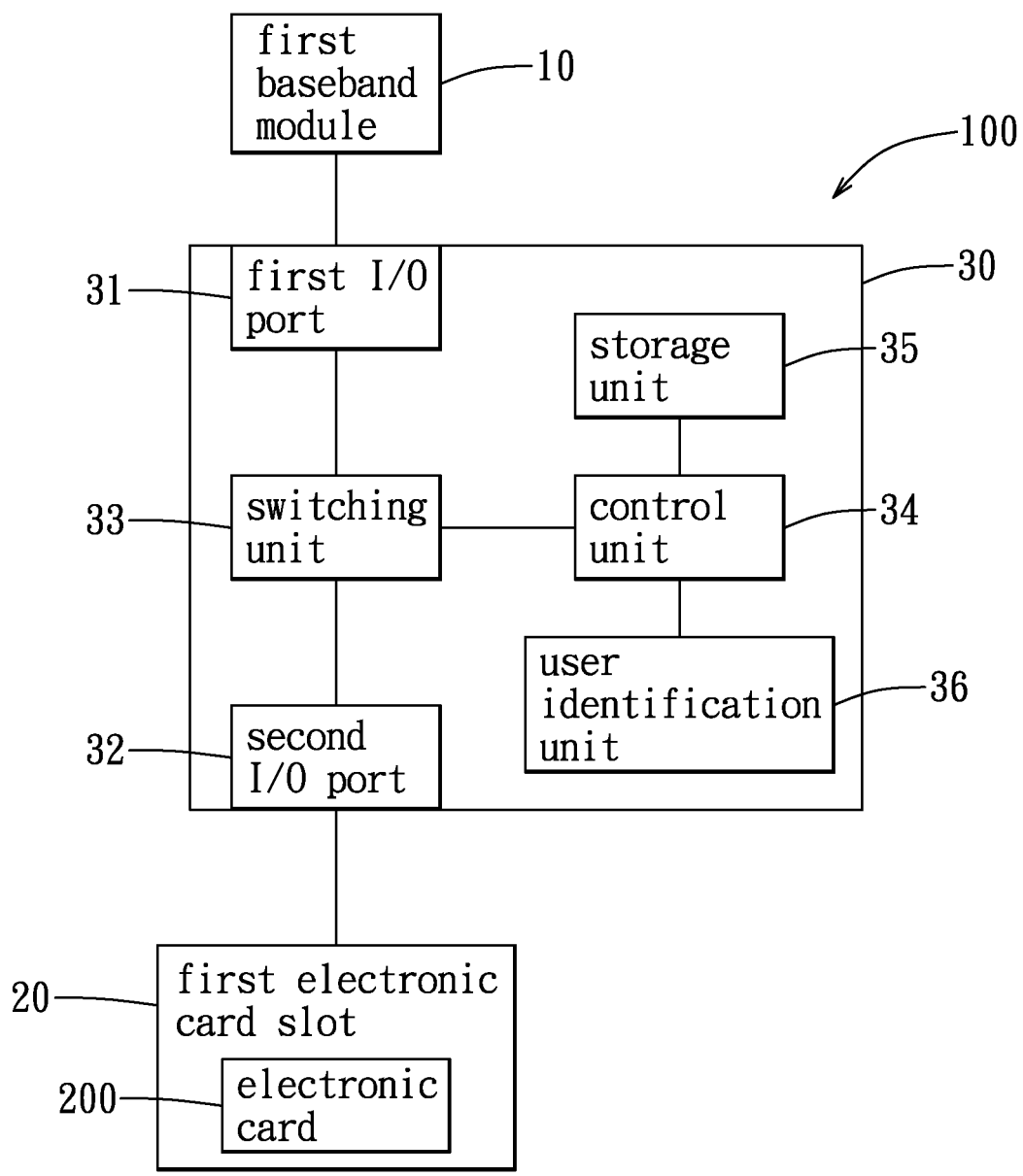
FIG. 2 is a schematic block diagram of a preferred embodiment of a mobile device according to the invention.

As shown in FIG. 2, the preferred embodiment of a mobile device 100 according to the present invention is a device that is configured to access mobile telephony services via a subscriber identity module (SIM), such as a cell phone and/or a personal digital assistant (PDA). In this embodiment, the mobile device 100 comprises a first baseband module 10, a first electronic card slot 20 to be connected to an electronic card 200, and a control module 30. The first baseband module 10 is an input module that supports the International Organization for Standardization (ISO) 7816 specification, and the electronic card 200 can be a SIM card or a credit or bank card that has an Europay, MasterCard or Visa (EMV) chip.

Figure 4A:
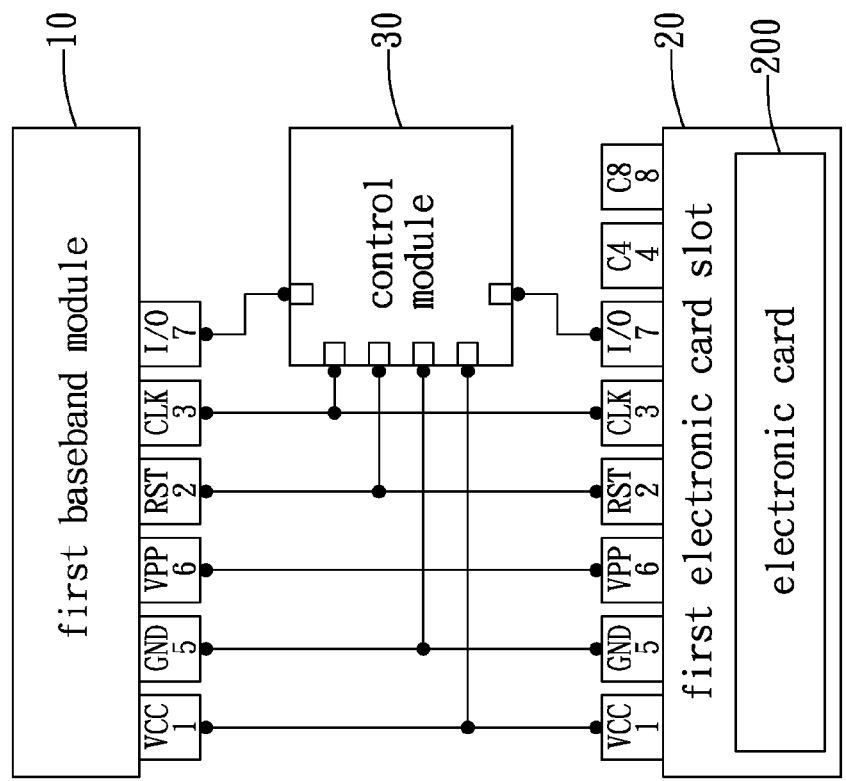
FIGS. 4A-4C illustrates different exemplary electrical connection configurations among the electronic card slot, a baseband module and a control module of the mobile device.
Figure 3:
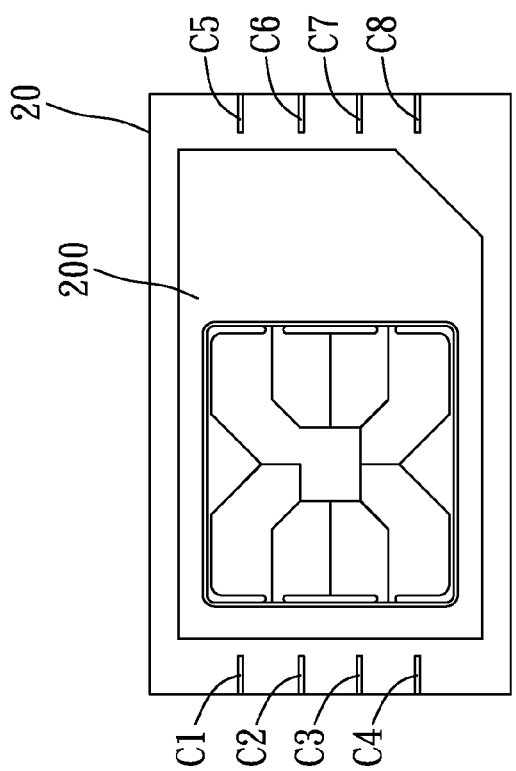
FIG. 3 is a schematic view of pin connections between an electronic card and an electronic card slot of the mobile device.

Further referring to FIGS. 3 and 4A, the first electronic card slot 20 includes eight pins C1-C8 for connecting electrically to the electronic card 200. The respective functionalities of the pins are as follows: C1 is a power pin, C2 is a reset pin, C3 is a clock signal pin, C5 is a ground pin, C6 is an internal programming voltage pin, C7 is a signal input/output (I/O) pin, and each of C4 and C8 is a reserve pin which may be in a floating state. In some examples where the electronic device 100 does not have the required number of pins to accommodate C4 and C8 (such as iPhone 5), the pins C4 and C8 can be omitted. The control module 30 is connected electrically to the first baseband module 10 and the first electronic card slot 20. In this embodiment, the control module 30 is an integrated circuit (IC) application chip having a Java card-based design, and is implemented with the first baseband module 30 onto a single IC chip. The effect of using the Java card-based design structure for the control module 30 is that the control module can be operable to process applications that are compatible with the Java card-based design structure (e.g., applications related to EMV, People's bank of China (PBOC), certificate authority (CA), and public key infrastructure (PKI)), and that the Java card-based design structure enables over-the-air (OTA) configuration, such that the operating system, applications and information stored in the control module 30 can be updated and maintained conveniently.

Figure 4C:
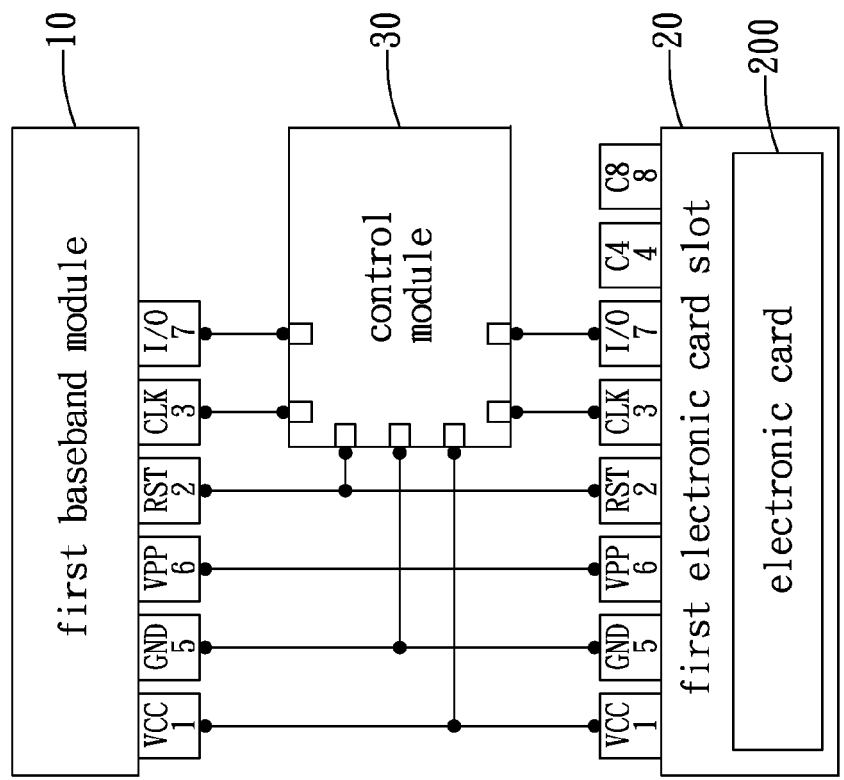
Figure 4B:
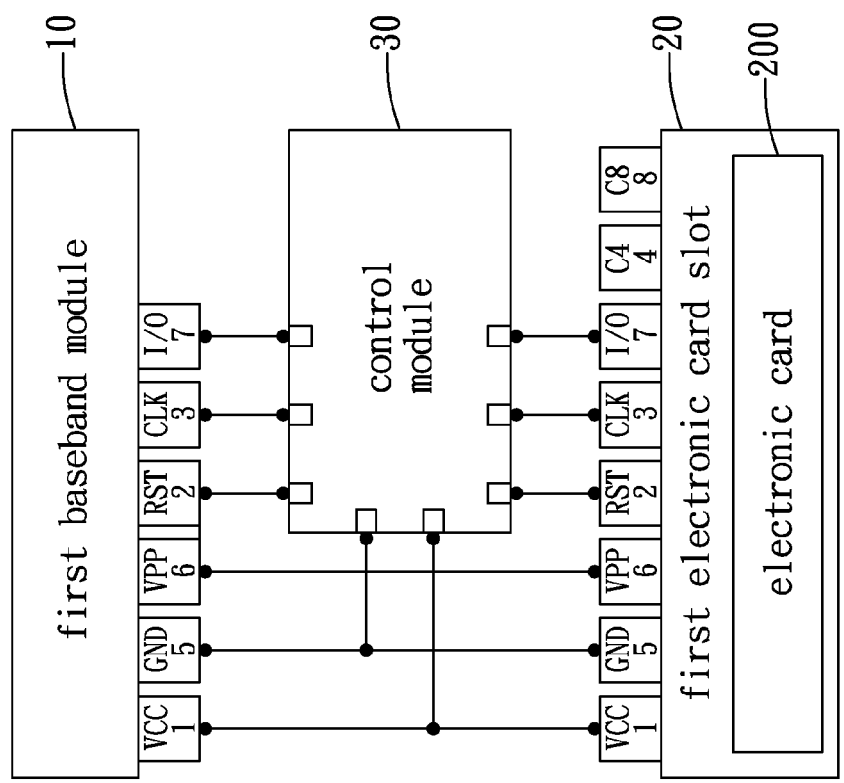

Each of FIGS. 4A-4C illustrates one of three exemplary electrical connection configurations among the control module 30, the first baseband module 10 and the first electronic card slot 20. As shown in FIG. 4A, in a first exemplary electrical connection configuration, the pins C1, C2, C3, C5 and C6 of the first electronic card slot 20 are coupled directly to the first baseband module 10 and the control module 30, while pin C7 is coupled to the control module 30, for communication between the first baseband module 10 and the electronic card 200 connected to the electronic card slot 20 via the control module 30. As shown in FIG. 4B, in a second exemplary electrical connection configuration, the pins C1, C5 and C6 of the first electronic card slot 20 are coupled directly to the first baseband module 10 and the control module 30, while pins C2, C3 and C7 are coupled to the control module 30, for communication between the first baseband module 10 and the electronic card 200 connected to the electronic card slot 20 via the control module 30. As shown in FIG. 4C, in a third exemplary electrical connection configuration, the pins C1, C2, C5 and C6 of the first electronic card slot 20 are coupled directly to the first baseband module 10 and the control module 30, while pins C3 and C7 are coupled to the control module 30, and are operable to communicate with the first baseband module 10 via the control module 10.

Referring back to FIG. 2, the control module 30 includes a first I/O port 31 coupled to the first baseband module 10, a second I/O port 32 coupled to the first electronic card slot 20, a switching unit 33 connected electrically to the first and second I/O ports 31 and 32, a control unit 34 coupled to the switching unit 33, a storage unit 35 coupled to the control unit 34 and having at least one executable program stored therein, and a user identification unit 36 coupled to the control unit 34.

The first I/O port 31 is operable to communicate with the first baseband module 10 using ISO7816 specification. The second I/O port 32 is operable to communicate with the electronic card 200 via the first electronic card slot 20.

In this embodiment, the switching unit 33 and the control unit 34 are implemented integrally using the IC application chip, but can be implemented integrally using software or a combination of software and hardware in other embodiments. The executable program that the storage unit 35 stores therein is a Java Applet program and/or a SIM application toolkit (STK), and can be obtained using OTA configuration. The user identification unit 36 is for storing personal information that is stored in the SIM card.

The switching unit 33 and the control unit 34 are configured to cooperate, based on a baseband signal received via the first baseband module 10 and the first I/O port 31, such that the control module 30 is operable to work in a number of different transmission modes. For example, the control unit 34 is configured to control the switching unit 33 to operate in a first transmission mode, in which the first I/O port 31 and the second I/O port 32 are electrically interconnected, such that, the first baseband module 10 is able to communicate with the electronic card 200, which is connected to the first electronic card slot 20. The control unit 34 is further configured to control the switching unit 33 to operate in a second transmission mode, in which the second I/O port 32 and the control unit 34 are electrically interconnected such that the control unit 34 that executes the at least one executable program stored in the storage unit 35 is able to communicate with the electronic card 200 that is connected to the first electronic card slot 20. In other transmission modes, the first baseband module 10 is able to communicate with the storage unit 35 and the user identification unit 36 via the first I/O port 31, the switching unit 33 and the control unit 34. The user identification unit 36 is able to communicate with the electronic card 200 that is connected to the first electronic card slot 20 via the control unit 34, the switching unit 33, and the second I/O port 32. The user identification unit 36 is further able to communicate with the storage unit 35 via the control unit 34. In brief, using the first and second I/O ports 31 and 32, the control unit 34 of the control module 30 is operable to open a specific channel within the control module 30 so as to enable two of the first baseband module 10, the electronic card 200, the storage unit 35 and the user identification 36 to communicate with each other, based on the baseband signal.

Figure 5:
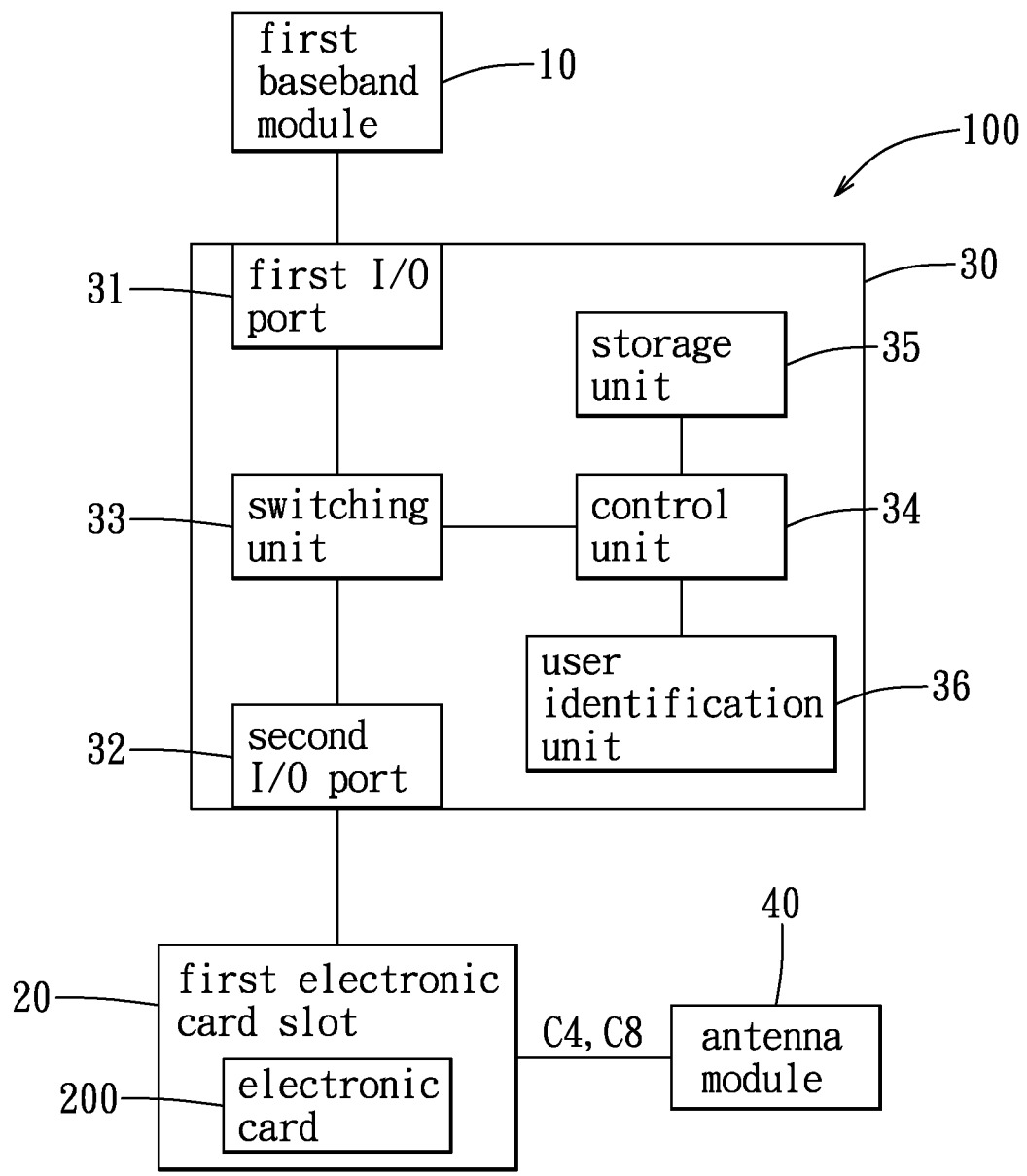
FIG. 5 is a schematic block diagram of the mobile device of FIG. 2, according to an aspect.
Figure 6:
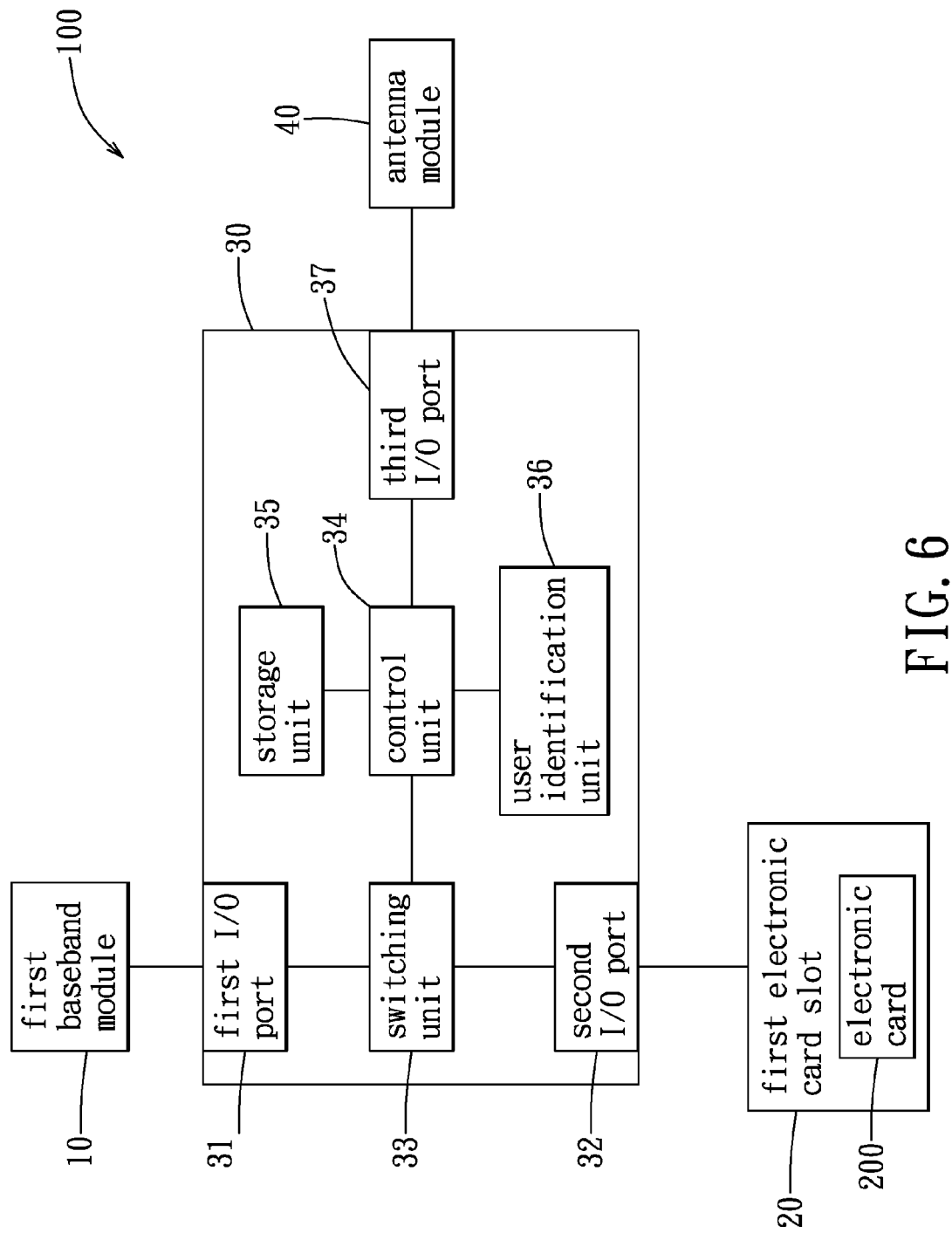
FIG. 6 is a schematic block diagram of the mobile device of FIG. 2, according to another aspect.

According to an aspect, the mobile device 100 can further comprise an antenna module 40 coupled to the control module 30 (see FIG. 5). The antenna module 40 includes two communication ports (not shown) to be connected electrically to the reserve pins C4 and C8 of the first electronic card slot 20, and is configured to support radio-frequency identification (RFID) and to support signal transmission using ISI14443 specification. Alternatively, the antenna module 40 can be connected to the control module 30 via a third I/O port 37 (see FIG. 6). Using the mechanism as described above, the antenna module 40 enables communication, with one of the control unit 34, the storage unit 35 and the user identification unit 36.

Figure 7:
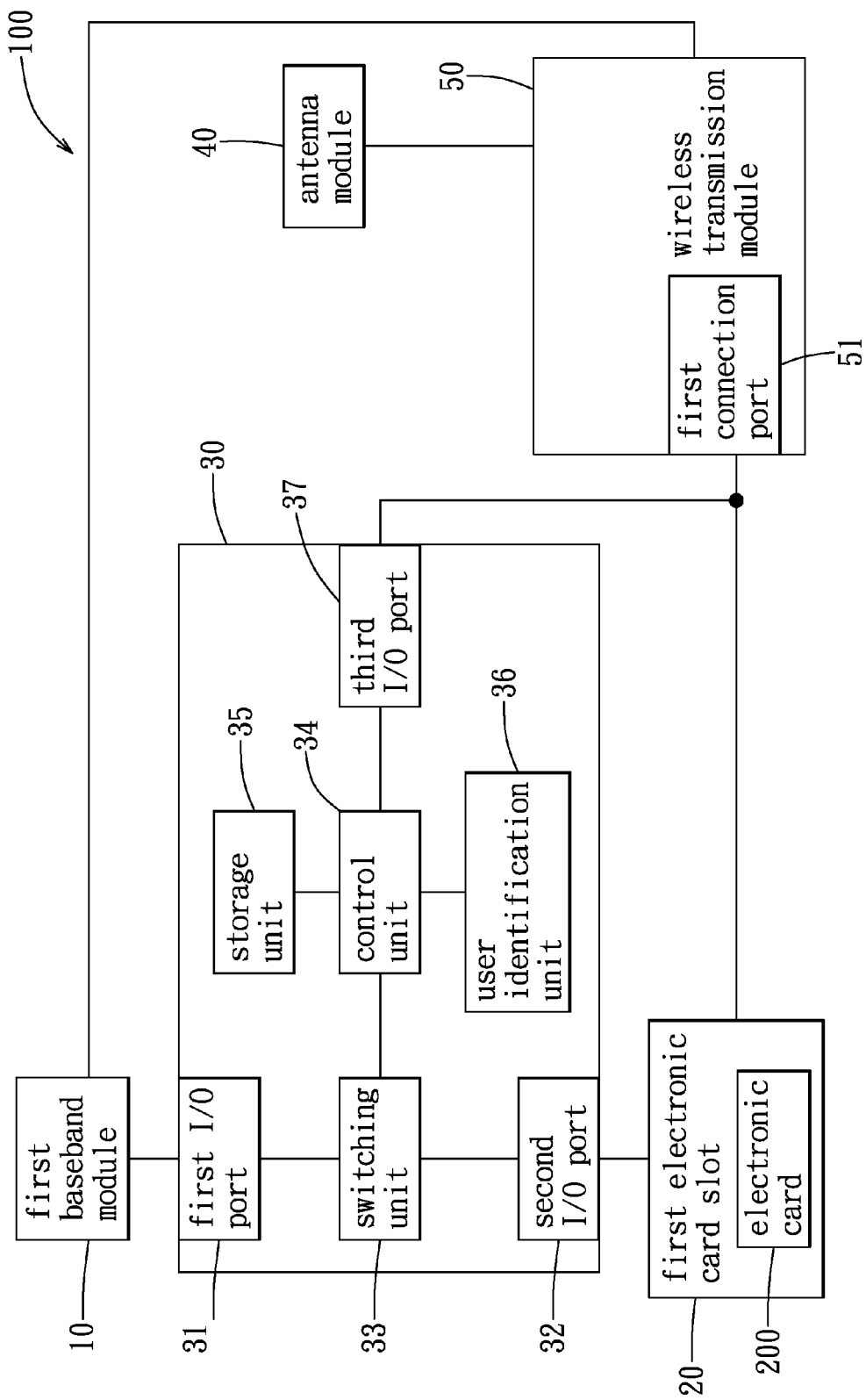
FIG. 7 is a schematic block diagram of the mobile device of FIG. 2, according to yet another aspect.

According to another aspect, the control module 30 may further include the third I/O port 37, and the mobile device 100 may further comprise a wireless transmission module 50 coupled to the first electronic card slot 20, the third I/O port 37 and the first baseband module 10, as best shown in FIG. 7. The antenna module 40 is coupled to the wireless transmission module 50 (see FIG. 7). The wireless transmission module 50 is configured to support near field communication (NFC) technology, and has a first connection port 51 for electrically connecting to the reserve pins C4 and C8 of the first electronic card slot 20 using ISO 14443 protocol or reserve pins C6 and GND using single wire protocol (SWP) specification. Additionally, the first electronic card slot 20 and the third I/O port 37 are coupled using one of soldering, a circuit connected therebetween, a multiplexer that can switch the connection port 51 to be connected to one of the electronic card slot 20 and the third I/O port 37, etc. As a result, the electronic card 200 that is connected to the first electronic card slot 20 is operable to communicate with the antenna module 40 and the wireless transmission module 50. Using the mechanism as described above, the antenna module 40 and the wireless transmission module 50 further enable communication with one of the control unit 34, the storage unit 35 and the user identification unit 36.

Figure 8:
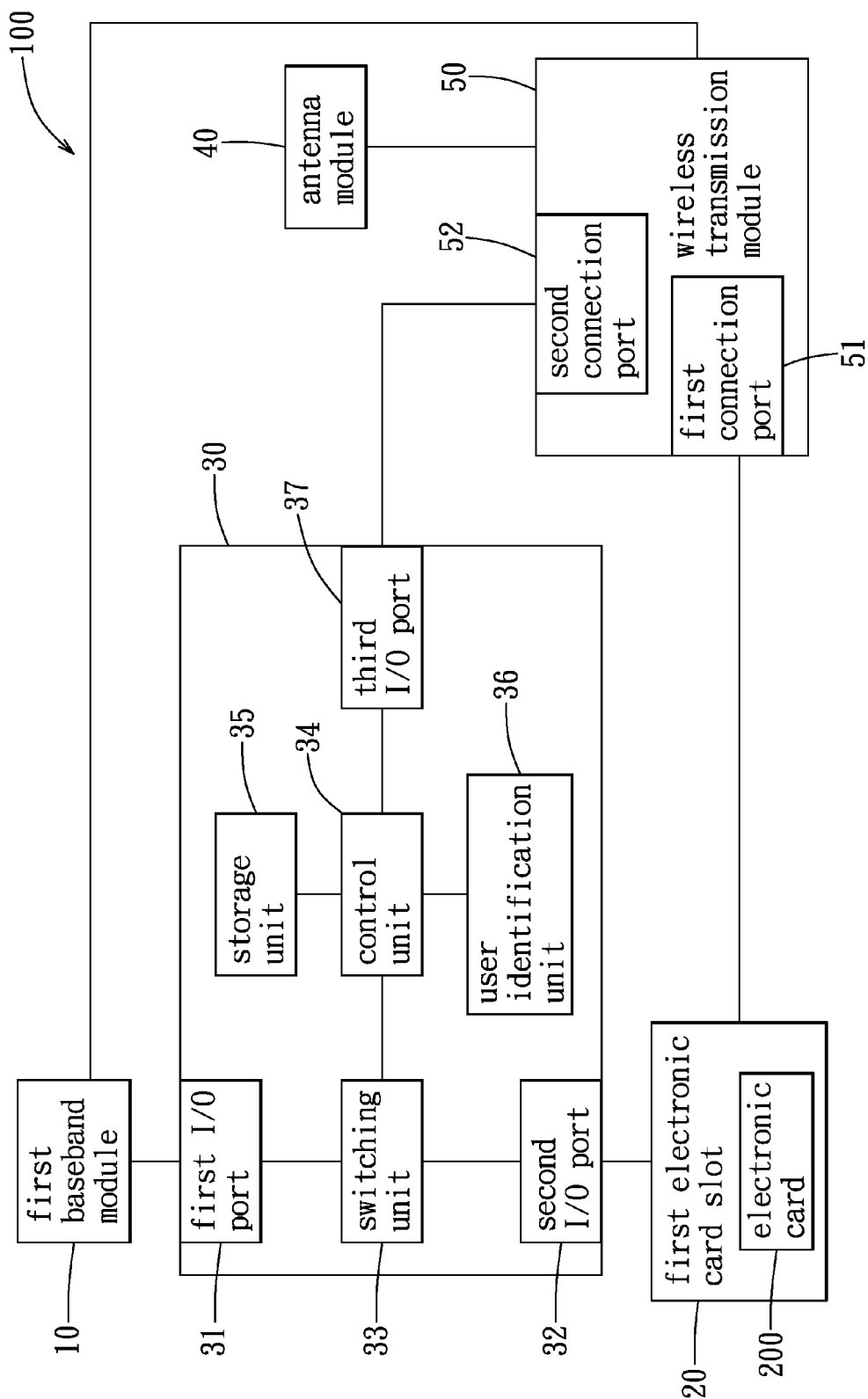
FIG. 8 is a schematic block diagram of the mobile device of FIG. 2, according to still another aspect.

According to yet another aspect, when the wireless transmission module 50 supports sigin-sigout connection (S2C) interface, a second connection port 52 is also included (see FIG. 8) for enabling communication using the S2C interface. There are a number of ways in which the first and second connection ports 51 and 52 may connect to the first electronic card slot 20 and the control module 30, based on the protocols supported by the wireless transmission module 50. For example, when the wireless transmission module 50 supports ISO14443 specification and SWP, for ISO 14443 the first connection port 51 is electrically connected to the reserve pins C4 and C8 of the first electronic card slot 20. For SWP protocol, the first connection port 51 is electrically connected to the reserve pings C6 and the ground pin C5 of the first electronic card slot 20 as described above. Alternatively, when the wireless transmission module 50 supports S2C interface, the first connection port 51 is electrically connected to the internal programming voltage pin C6 and the ground pin C5 of the first electronic card slot 20, and the second connection port 52 is electrically connected to the third I/O port 37 via the S2C interface. In other embodiments, the reserve pins C4 and C8 can be electrically connected to the first connection port 51 and the third I/O port 37, respectively.

In addition to the above mentioned transmission function, the control module 30 of this invention is configured such that functionality of the SIM card can be provided by the mobile telephony service provider using OTA configuration or built in the user identification unit 36 of the control module 30. Therefore, the control module 30 serves the effect of the SIM card, and the first electronic card slot 20 is left available to be connected electrically to other card modules. It is noted that, in other examples, the mobile device 100 further comprises a secure digital (SD) card slot (not shown), and the control module 30 may include a fourth I/O port (not shown) electrically connected to the SD card slot. As a result, the SD card slot is also available to be connected electrically to other card modules.

Figure 9:
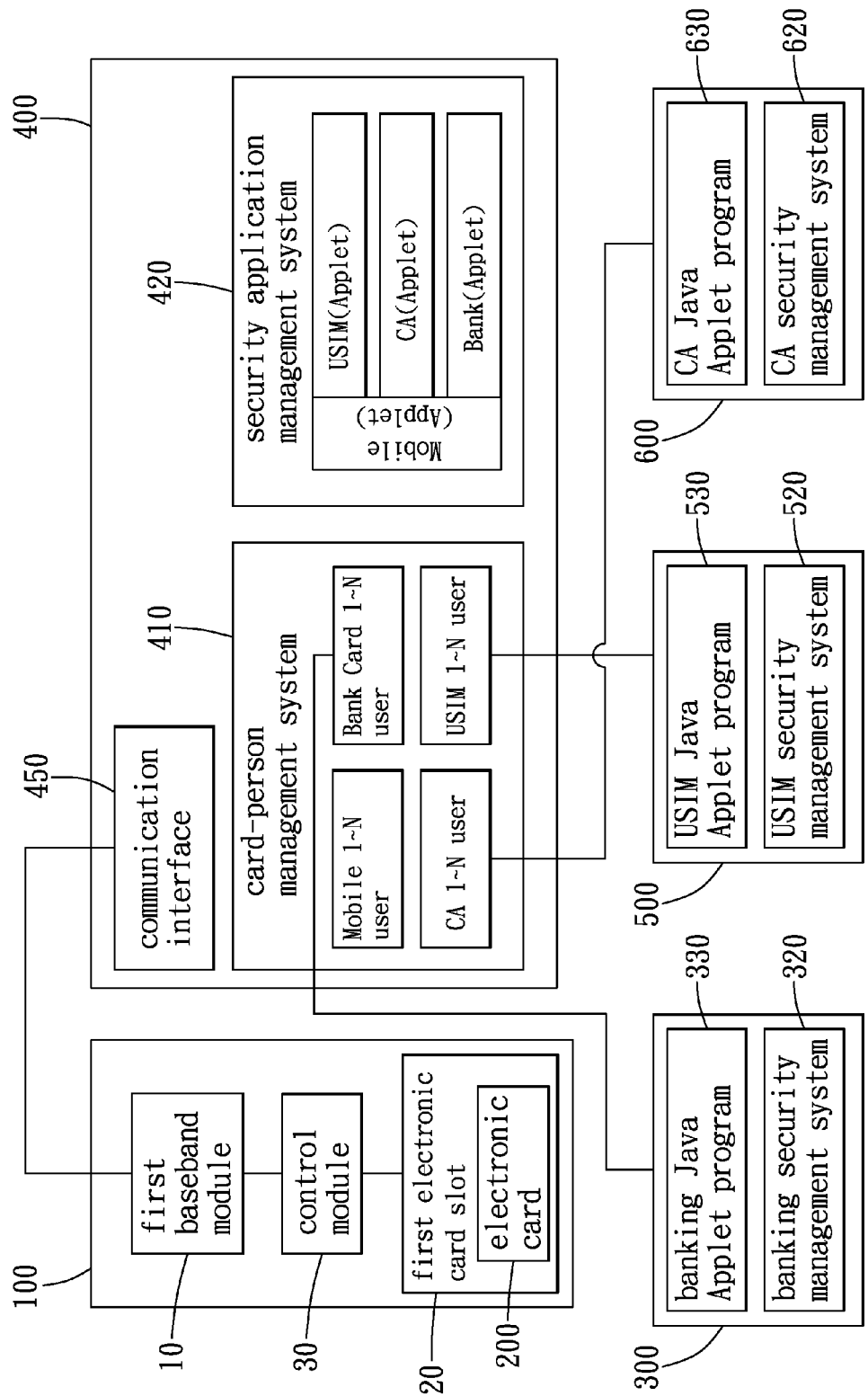
FIG. 9 is a schematic block diagram of a transaction system of the preferred embodiment.

The mobile device 100 of this invention can be utilized with a transaction system shown in FIG. 9. The transaction system comprises a network platform 400 that is configured to communicate with the mobile device 100 via the electronic card 200. In this case, the electronic card 200 can be issued by one of a bank associated with a banking service terminal 300, a mobile telephony service provider associated with a universal subscriber identity module (USIM) service terminal 500, and a CA institution (e.g., a governmental institution) associated with a CA service terminal 600. Each of the banking service terminal 300, the USIM service terminal 500 and the CA service terminal 600 includes a security management system (320, 520 and 620 in FIG. 9) for managing the personal information associated with the respective electronic cards 200, and a Java Applet program (330, 530 and 630 in FIG. 9) for implementing respective desired functions.

The network platform 400 includes a card-personalization management system 410, a security application management system 420, and a communication interface 450. The card-person management system 410 is configured to store client information associated with users using services provided by the bank, the mobile telephony service provider and the CA institution, and to store information associated with the mobile device 100. The security application management system 420 includes a plurality of programs from the terminals 300, 500 and 600 (i.e., the Java Applet programs 330, 530 and 630). Information that is stored in the network platform 400 can be encrypted using symmetric-key algorithm or public-key algorithm, and can be managed using a hardware security module (HSM).

Based on the type of the electronic card 200, the control module 30 is operable to download the Java Applet program associated with the electronic card 200 from the security application management system 420. For example, when the electronic card 200 is an EMV bankcard, the control module 30 is operable to communicate with the communication interface 450 for obtaining a bank Java Applet 530 and a bank application from the security application management system 420. Then, the bank application is stored in a memory module (not shown) of the mobile device 100, and the bank Java Applet 530 is transmitted to the control module 30 via the first baseband module 10, the first I/O port 31 and the switching unit 33. The control unit 34 of the control module 30 is operable to store the bank Java Applet 530 in the storage module 35. Afterward, when it is required that the electronic card 200 communicate with the bank Java Applet 530 (e.g., when the user of the mobile device 100 makes a request to access the bank Java Applet 530 using the bank application), the control module 30 is operable to perform this task by operating in the second transmission mode, in which the second I/O port 32 and the control unit 34 are electrically interconnected, such that, the control unit 34 that executes the bank Java Applet 530 is able to communicate with the electronic card 20. The interaction between the bank Java Applet 530 and the electronic card 200 can be then transmitted, using ISO8583 specification, to the network platform 400 via the first I/O port 31, the first baseband module 10 and the communication interface 450. This configuration enables the mobile device 100 to emulate a point of sale (POS) operation such as online shopping and making a payment using the bankcard. Moreover, since the bank Java Applet 530 is able to encrypt the data that is to be transmitted to the network platform 400 using the encryption mechanism used by the bank, security of data transmission between the mobile device 100 and the network platform 400 is enhanced.

Figure 10:
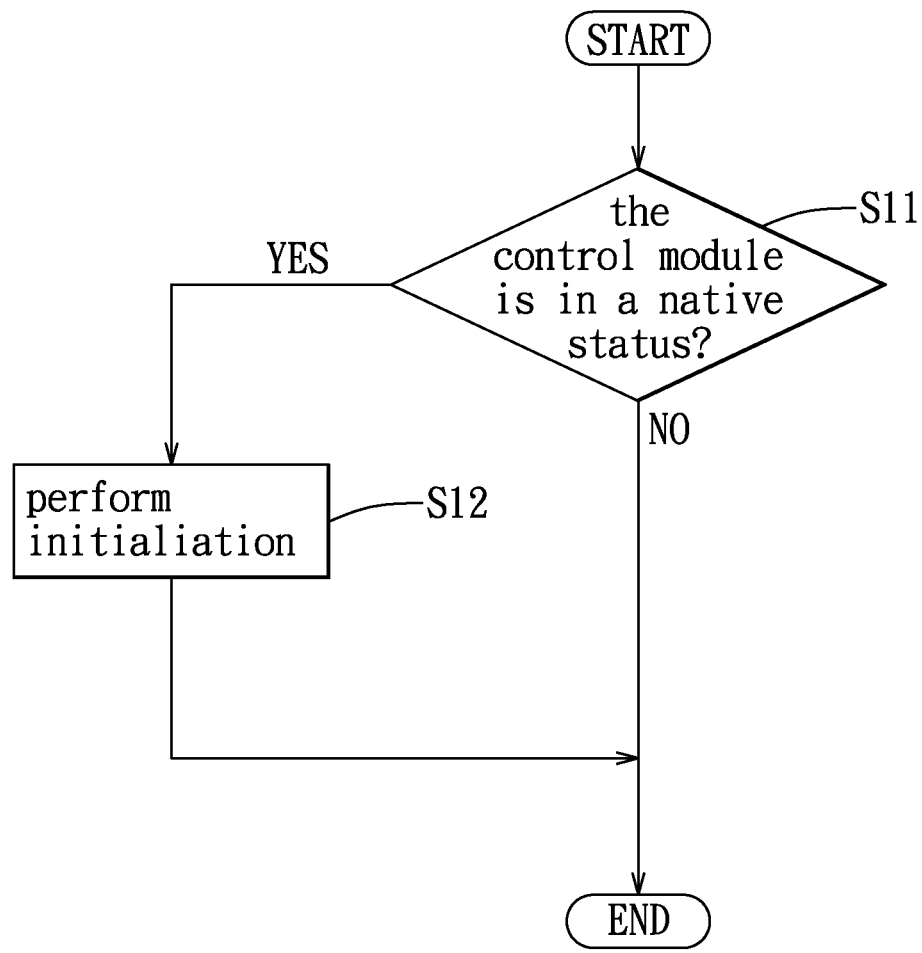
FIG. 10 is a flowchart of an initialization procedure performed on the control module of the mobile device.

In order to achieve the Java card effect, an initialization procedure as shown in FIG. 10 must be performed on the control module 30 of the mobile device 100. In the initialization procedure, it is first determined in step S11 whether the control module 30 is in a native status (i.e., the control module 30 is a native card) using, for example, a card reader or the like. When the determination made in step S11 is affirmative, the initialization is performed on the control module 30 in step S12, in which specific operating system and card-management program are installed into the control module 30. In this example, a Java card virtual machine OS, along with a plurality of applications (e.g., mobile banking token, gaming user authorization and coupon for coffee), can be installed into the control module 30 for display on a screen (not shown) of the electronic device 100. Otherwise, the control module 30 already has OS and applications installed, and needs no initialization.

Afterward, when the electronic card 200 is inserted into the first electronic card slot 20, the control module 30 enables the electronic card 200 to communicate with the program stored in the storage unit 35. The following paragraphs are directed to a method of signal transmission to be implemented by the control module 30. In the following example, the electronic card 200 is a bankcard.

Figure 11A:
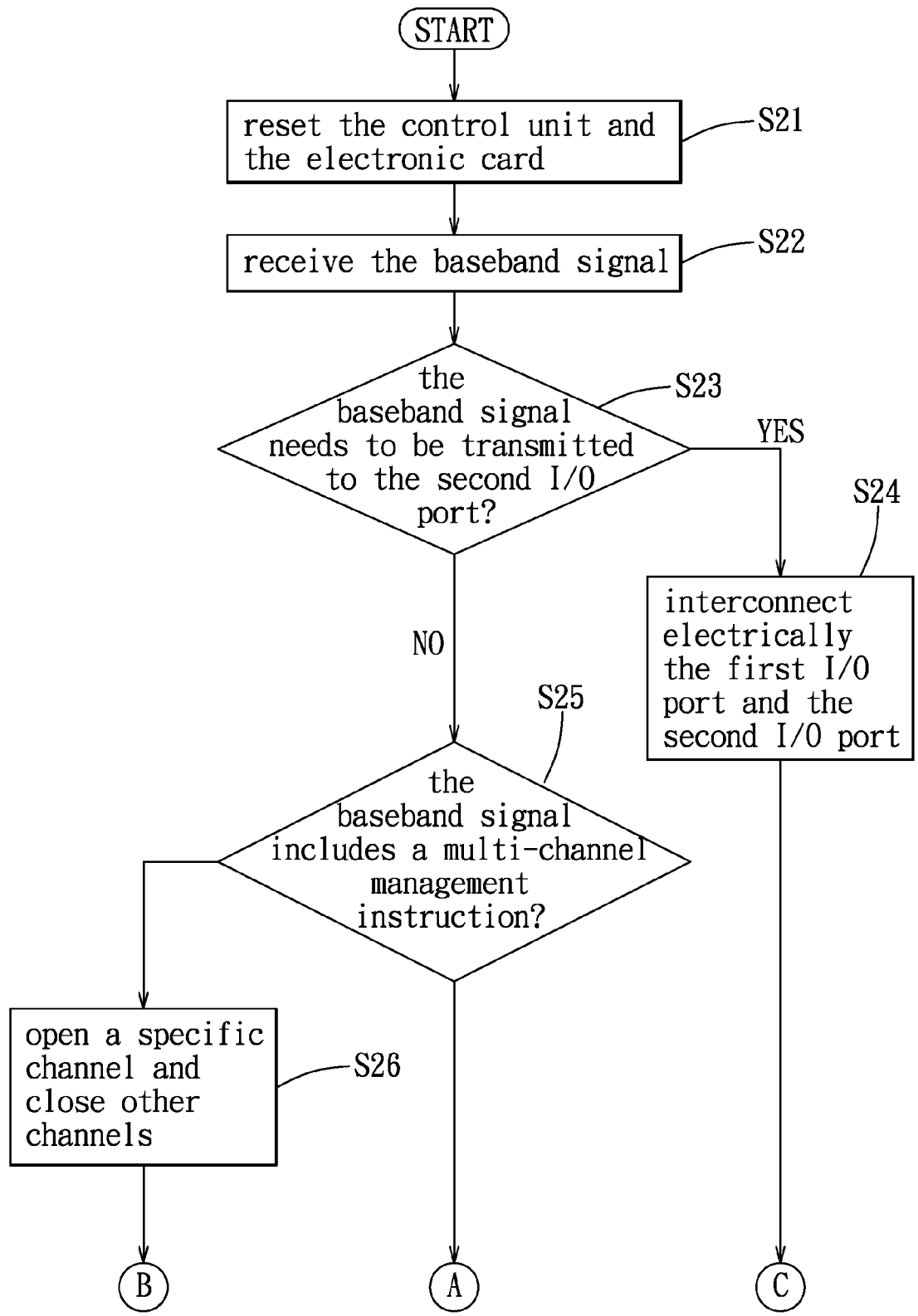
FIGS. 11A-11B is a flowchart of a method of signal transmission implemented by the control module of the mobile device of the present invention.
Figure 11B:
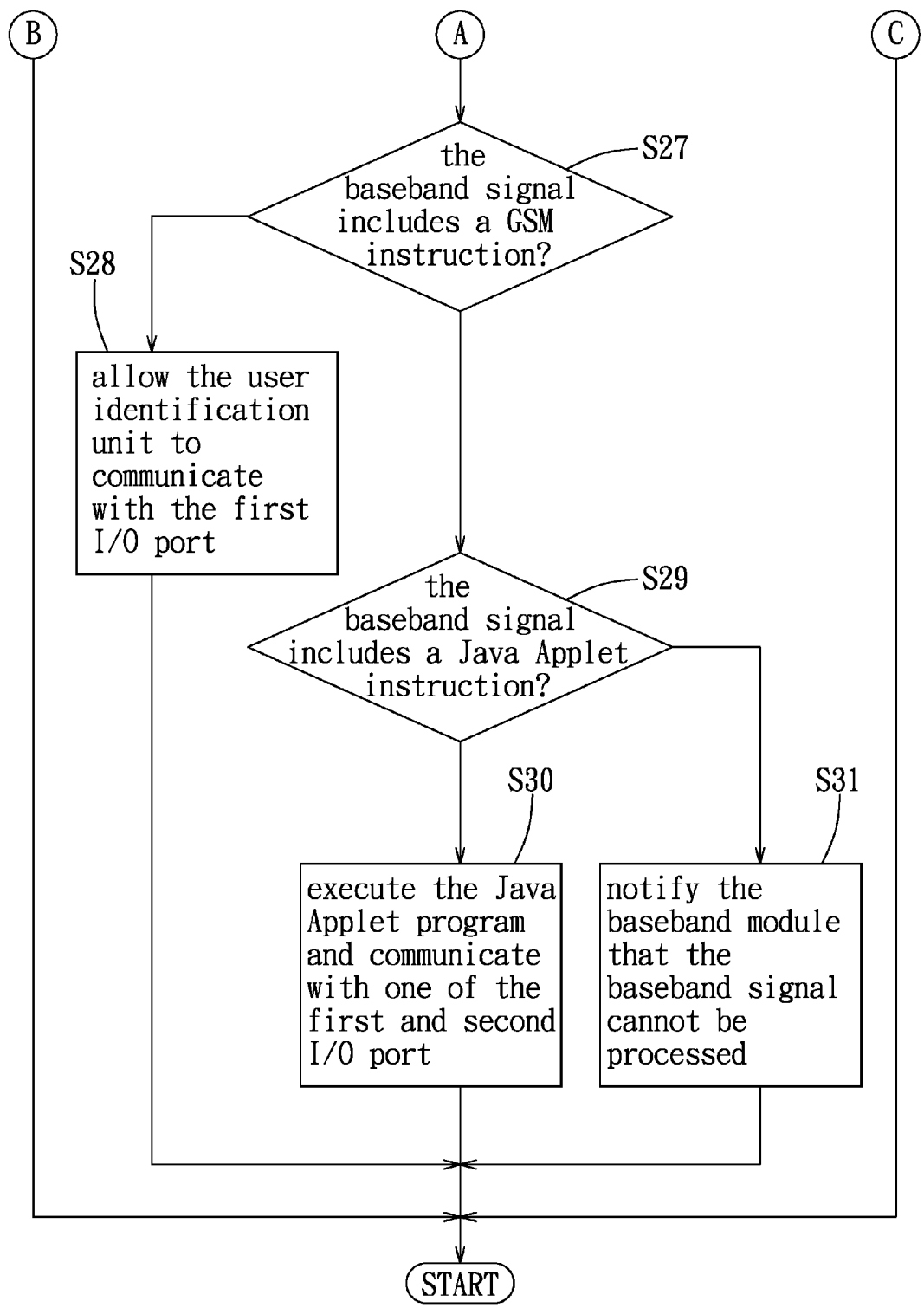

Referring to FIG. 11, in step S21, when the mobile device 100 is activated, the baseband module 10 is operable to send a reset signal to the control module 30 and the first electronic card slot 20. Accordingly, the control unit 34 of the control module 30 and the electronic card 200 that is connected to the first electronic card slot 20 are reset. It is noted that, there are two different modes to reset the control module 30 and the electronic card 200. One involves resetting the control module 30, and configuring the control module 30 to reset the electronic card 200. The other one involves directly resetting both the control module 30 and the electronic card 200. In some examples, when control module 30 and the electronic card 200 that is connected to the electronic card slot 20 do not need to be reset, the step S21 can be omitted from the method. In step S22, the control module 30 is operable to receive the baseband signal from the baseband module 10 using the first I/O port 31. Then, the control unit 34 is operable in step S23 to determine, using a flag of the baseband signal, whether the baseband signal needs to be transmitted to the second I/O port 32. When the flag of the baseband signal received from the baseband module 10 using the first I/O port 31 conforms with a corresponding flag in the control unit 34, it is determined the baseband signal needs to be transmitted to the second I/O port 32, and the control unit 34 is operable to control the switching unit 33 to operate in the first transmission mode for interconnecting electrically the first I/O port 31 and the second I/O port 32 in step S24. In this example, the affirmative determination means that the baseband signal is associated with the electronic card 200 connected to the first electronic card slot 20, and such that a channel between the baseband module 10 and the electronic card 200 must be opened. The method is then terminated. Otherwise, the flow proceeds to step S25.

In step S25, the control unit 34 is operable to determine whether the baseband signal received from the baseband module 10 via the first I/O port 31 includes a multi-channel management instruction. The multi-channel management instruction indicates a specific channel directing to one of the programs stored in the storage unit 35. When the determination made in step S25 is affirmative, the control unit 34 is operable to open the specific channel and to temporarily stop transmission within other channels in step S26. In this example, the control unit 34 opens the channel directed to the bank Java Applet, and is operable to store unsaved data of closed channels in a memory cache (not shown) of the control module 30. The method is then terminated. Otherwise, the flow proceeds to step S27.

In step S27, the control unit 34 is operable to determine whether the baseband signal includes an identity verifying instruction. The identity verifying instruction is generally associated with the identification of a user of the electronic device 100, such as a global system for mobile communications (GSM) instruction, a code division multiple access (CDMA) instruction, and a wideband code division multiple access (W-CDMA) instruction, 2G, 3G, 4G cellular identity instruction. When the determination made in step S27 is affirmative, the control unit 34 is operable to allow the user identification unit 36 to communicate with the first I/O port 31 in step S28. Accordingly, the user identification unit 36 is operable to communicate with the baseband module 10. The method is then terminated. Otherwise, the flow proceeds to step S29.

In step S29, the control unit 34 is operable to determine whether the baseband signal includes a Java Applet instruction. The Java Applet instruction is related to the Java Applet program stored in the storage unit 35. When the determination made in step S29 is affirmative, the control unit 34 is operable to execute the Java Applet program and to communicate with one of the first and second I/O ports 31 and 32 in step S30. As a result, one of the baseband module 10 and the electronic card 200 is able to communicate with the Java Applet program. The method is then terminated. Otherwise, the flow proceeds to step S31.

In step S31, the control unit 34 notifies the baseband module 10 that the baseband signal (e.g., a JAVA card runtime environment (JCRE) special instruction, or other testing or unknown instruction) cannot be processed by the control module 30, and needs to be processed by other modules of the mobile device 100. The destination of the baseband signal can be determined by a rule condition stored on the control unit 34. In this example, the control unit 34 transmits the baseband signal back to the baseband module 10 based on the rule condition. In other examples, the baseband signal can be transmitted to other modules of the mobile device 100 via the switching unit 33. It is noted that in steps S30 and S31, the operations are executed in specific circuit blocks (not shown) in a JCRE layer of the control module 30.

In the above example, the control module 30 continuously receives baseband signals from the baseband module 10, and the control unit 34 processes one of the baseband signals at a time. After the one of the baseband signals is processed, the method is terminated and the flow returns to step S22 to receive another one of the baseband signals. In other examples, after the one of the baseband signals is processed, the flow may return immediately to step S22.

In brief, in the signal transmission method, the control unit 34 is operable to allow different parts of the control module 30 to communicate with the baseband module 10 and/or the electronic card 200 based on the received baseband signal, and to transmit the baseband signal that is deemed not processable back to the baseband module 10. In other examples, the electronic card 200 can be an electronic ID card issued by a governmental institution or a USIM card provided by a mobile telephony service provider, and the above method is also suitable for performing the corresponding signal transmission function.

It is noted that the mobile device 100 is operable to update the programs stored in the storage unit 35 using OTA and/or trusted service manager (TSM) configuration. As a result, institutions and/or corporations (e.g., a bank, a CA institution, etc.) may cooperate with the mobile telephony service provider to create a wide variety of related applications for fitting various commercial needs of the mobile device 100. For example, the user can be allowed to execute operations related to the SIM when communicating with a telephony service provider, such as issuance, termination, declaring invalid, changing to another mobile telephony service provider, etc.

Figure 12:
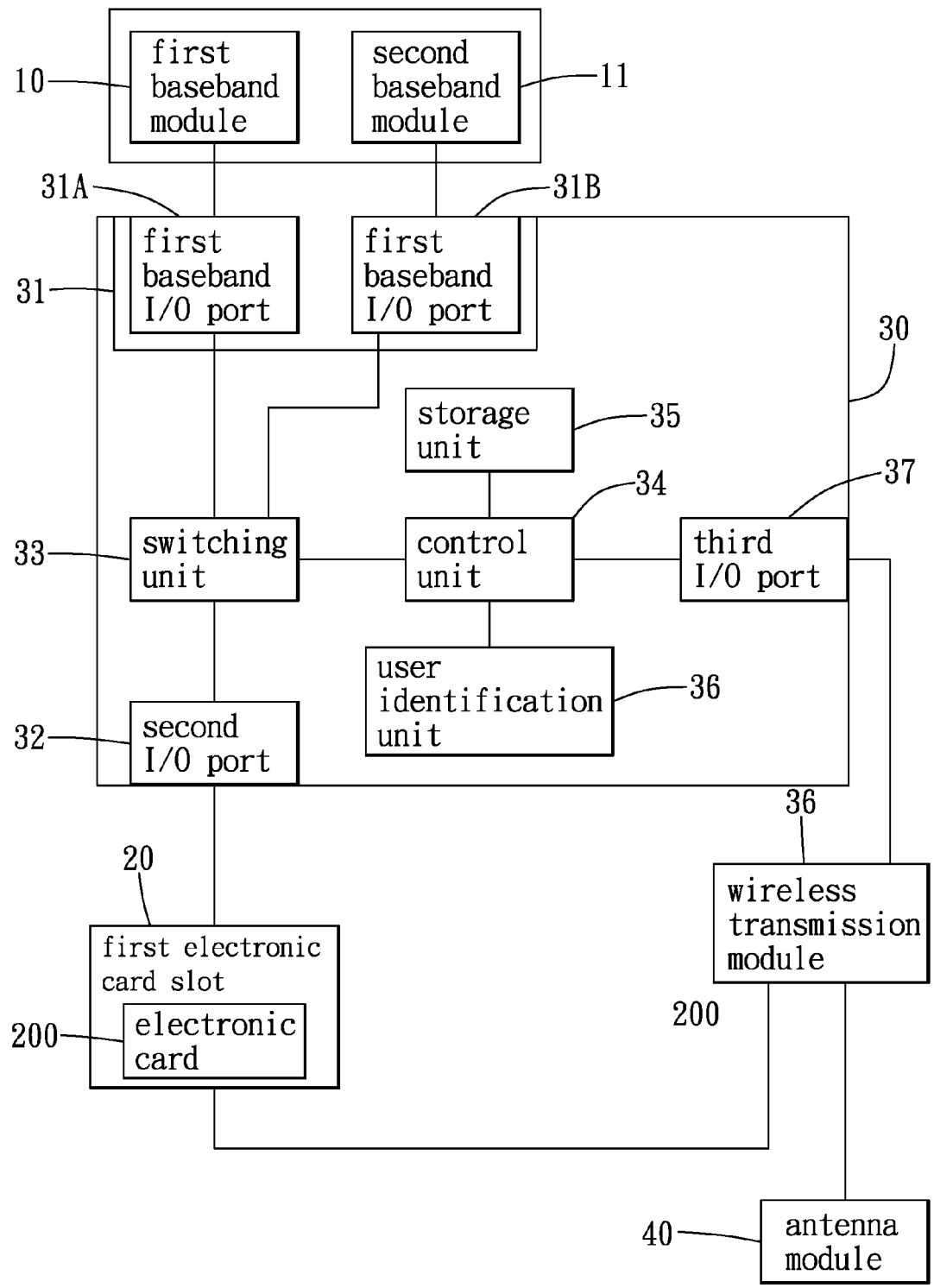
FIG. 12 is a schematic block diagram of the mobile device having a dual-card configuration.

According to another example, the mobile device 100 is configured to support a dual-card configuration. As shown in FIG. 12, the mobile device 100 further comprises a second baseband module 11 coupled to the first I/O port 31 and the user identification unit 36. In this case, the user identification unit 36 is configured to seamlessly simulate another SIM electronic card 200, such that the mobile device does not need to prepare another electronic card slot.

Specifically, the first I/O port 31 includes a first baseband I/O port 31A for coupling to the first baseband module 10 and a second baseband I/O port 31B for coupling to the second baseband module 11 and the seamlessly simulated SIM card (in this case being user identification unit 36), respectively.

The operation of the mobile device 100 in this example is similar to that described above. The control unit 34 is configured to control the switching unit 33 to operate in the first transmission mode based on the baseband signal received from one of the first and second baseband modules 10 and 11 via one of the first and second baseband I/O ports 31A and 31B, and the switching unit 33. The first I/O port 31 and the second I/O port 32 are electrically interconnected in the first transmission mode such that one of the first and second baseband modules 10 and 11 is able to communicate with one of the electronic card 20 and the second similar electronic card (case user identification unit 36). Each of the first and second baseband modules 10 and 11 is able to communicate with the user identification unit 36 via one of the first and second baseband I/O ports 31A and 31B, the switching unit 33 and the control unit 34.

In this example, the mobile device 100 may further include the third I/O port 37, the antenna module 40 and the wireless transmission module 50.

To sum up, the control module 30 that is implemented into the mobile device 100 is operable to serve the functionality of the SIM card, and to provide communication channels between the expansion slots of the mobile device 100 (i.e., the electronic card slot 20 and/or the SD card slot) and the functional blocks of the mobile device 100 (i.e., the baseband modules 10 and 11, the storage unit 35, the user identification unit 36, etc.). With the Java card virtual machine architecture of the control module 30, Java-based programs (i.e., Java Applet programs) stored in the storage unit 35 are able to communicate with the electronic cards 200 inserted into the electronic card slot 20, and as a result, various types of the electronic cards 200 are rendered compatible to communicate with the mobile device 100, or with the network platform 400 via the mobile device 100, via the expansion slots that are coupled to the control module 30.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A mobile device, comprising:
a first baseband module;
an electronic card slot to be connected to an electronic card; and
a control module including
a first input/output (I/O) port coupled to said first baseband module,
a second I/O port coupled to said electronic card slot,
a switching unit connected electrically to said first and second I/O ports,
a control unit coupled to said switching unit, and
a storage unit coupled to said control unit and having at least one executable program stored therein,
wherein said control unit is configured to control said switching unit to operate in a first transmission mode, in which said first I/O port and said second I/O port are electrically interconnected such that said first baseband module is able to communicate with the electronic card that is connected to said electronic card slot, based on a baseband signal received from said first baseband module via said first I/O port and said switching unit,
wherein said control unit is further configured to control said switching unit to operate in a second transmission mode, in which said second I/O port and said control unit are electrically interconnected such that said control unit that executes said at least one executable program stored in said storage unit is able to communicate with the electronic card that is connected to said electronic card slot;

wherein said control module further includes a user identification unit that is coupled to said control unit such that said first baseband module is able to communicate with said user identification unit via said first I/O port, said switching unit and said control unit.

2. The mobile device as claimed in claim 1, further comprising an antenna module coupled to said control module.

3. The mobile device as claimed in claim 2, wherein said electronic card slot includes a power pin, a reset pin, a clock pin, a ground pin, an internal programming voltage pin, a signal I/O pin and at least one reserve pin for coupling to said antenna module.

4. The mobile device as claimed in claim 1, wherein said control module further includes a third I/O port coupled to said control unit, said mobile device further comprising
a wireless transmission module coupled to said electronic card slot, said third I/O port and said first baseband module, and
an antenna module coupled to said wireless transmission module.

5. The mobile device as claimed in claim 4, wherein said electronic card slot includes a power pin, a reset pin, a clock pin, a ground pin, an internal programming voltage pin, a signal I/O pin and at least two reserve pins for coupling to said wireless communication module and said third I/O port, respectively.

6. The mobile device as claimed in claim 4, wherein said wireless transmission module includes a first communication pin for coupling to said electronic card slot, and a second communication pin for coupling to said third I/O port.

7. The mobile device as claimed in claim 1, wherein said control module is an integrated circuit (IC) application chip having a Java card-based design, and said at least one executable program is a Java Applet program.

8. The mobile device as claimed in claim 1, further comprising a second baseband module coupled to said first I/O port, wherein:
said first I/O port includes a first baseband I/O port coupled to said first baseband module, and a second baseband I/O port coupled to said second baseband module;
said control unit is configured to control said switching unit to operate in the first transmission mode based on a baseband signal received from one of said first and second baseband modules via one of said first and second baseband I/O port units and said switching unit; and
in the first transmission mode, one of said first and second baseband I/O ports of said first I/O port and said second I/O port are electrically interconnected such that said one of said first and second baseband modules is able to communicate with the electronic card that is connected to said electronic card slot.

9. The mobile device as claimed in claim 8, wherein said control module further includes a user identification unit that is coupled to said control unit such that each of said first and second baseband modules is able to communicate with said user identification unit via one of said first and second I/O baseband ports of said first I/O port, said switching unit and said control unit.

10. The mobile device as claimed in claim 1, wherein said control module and said first baseband module are implemented onto a single integrated circuit chip.

11. The mobile device as claimed in claim 1, wherein said switching unit and said control unit are implemented integrally using one of hardware, software and a combination thereof.

12. A transaction system comprising:
a network platform including a security application management system that includes a plurality of programs, and a communication interface; and
a mobile device including
a baseband module configured to communicate with said network platform via said communication interface,
an electronic card slot to be connected to an electronic card, and
a control module including
a first input/output (I/O) port coupled to said baseband module,
a second I/O port coupled to said electronic card slot,
a switching unit connected electrically to said first and second I/O ports,
a control unit coupled to said switching unit, and
a storage unit coupled to said control unit;
wherein said control unit is configured:
to download at least one of the programs from said security application management system;
to store said at least one of the programs in said storage unit;
to control said switching unit to operate in a first transmission mode, in which said first I/O port and said second I/O port are electrically interconnected such that said baseband module is able to communicate with the electronic card that is connected to said electronic card slot, based on a baseband signal received from said baseband module via said first I/O port and said switching unit; and
to control said switching unit to operate in a second transmission mode, in which said second I/O port and said control unit are electrically interconnected such that said control unit that executes said at least one of the programs in said storage unit is able to communicate with the electronic card that is connected to said electronic card slot;
wherein said control module further includes a user identification unit that is coupled to said control unit such that said baseband module is able to communicate with said user identification unit via said first I/O port, said switching unit and said control unit.

13. The transaction system as claimed in claim 12, wherein said network platform further includes a card-personalization management system for storing client information.

14. The transaction system as claimed in claim 12, wherein said control module is an integrated circuit (IC) application chip having a Java card-based design, and said at least one of the programs is a Java Applet program.

15. The transaction system as claimed in claim 12, wherein said control module and said baseband module are implemented onto a single integrated circuit chip, and said switching unit and said control unit are implemented integrally using one of hardware, software and a combination thereof.

16. A method of signal transmission to be implemented by a control module of a mobile device, the control module including a first input/output (I/O) port to be coupled to an input module, a second I/O port to be coupled to an electronic card slot, a switching unit connected electrically to the first and second I/O ports, a control unit coupled to the switching unit, and a user identification unit coupled to the control unit, said method comprising the following steps of:

configuring the control unit to control the switching unit to operate in a first transmission mode, in which the first I/O port and the second I/O port are electrically interconnected, when a flag of an input signal received from the input module using the first I/O port conforms with a corresponding flag in the control unit; and configuring the control unit to open a specific channel and to temporarily stop transmission within other channels when a multi-channel management instruction indicating the specific channel is received from the input module via the first I/O port;

wherein said method further comprises the following sub-step of:

configuring the control unit to allow the user identification unit to communicate with the first I/O port when the input signal received from the input module includes an identity verifying instruction.

17. The method as claimed in claim 16, further comprising the step of:

resetting the control unit and the electronic card that is connected to said electronic card slot upon receipt of a reset signal from the input module.

18. The method as claimed in claim 16, further comprising the following sub-step of:

configuring the control unit to communicate with one of the first and second I/O ports when the input signal received from the input module includes a Java Applet instruction.

19. The method as claimed in claim 16, further comprising the following sub-step of:

configuring the control unit to notify the input module when the input signal received from the input module is one that cannot be processed by the control unit.

* * * * *